Sept. 14, 1943. N. NELSON 2,329,414

AERIAL APPARATUS

Filed Sept. 18, 1940 4 Sheets-Sheet 1

NICHOLAS NELSON
INVENTOR.

BY John P. Nikonow
ATTORNEY.

Sept. 14, 1943. N. NELSON 2,329,414

AERIAL APPARATUS

Filed Sept. 18, 1940 4 Sheets-Sheet 2

NICHOLAS NELSON

INVENTOR.

BY John P. Wilkinson

ATTORNEY

Sept. 14, 1943. N. NELSON 2,329,414

AERIAL APPARATUS

Filed Sept. 18, 1940 4 Sheets-Sheet 3

NICHOLAS NELSON
INVENTOR.

BY John P. Nikonow

ATTORNEY

Sept. 14, 1943. N. NELSON 2,329,414
AERIAL APPARATUS
Filed Sept. 18, 1940 4 Sheets-Sheet 4
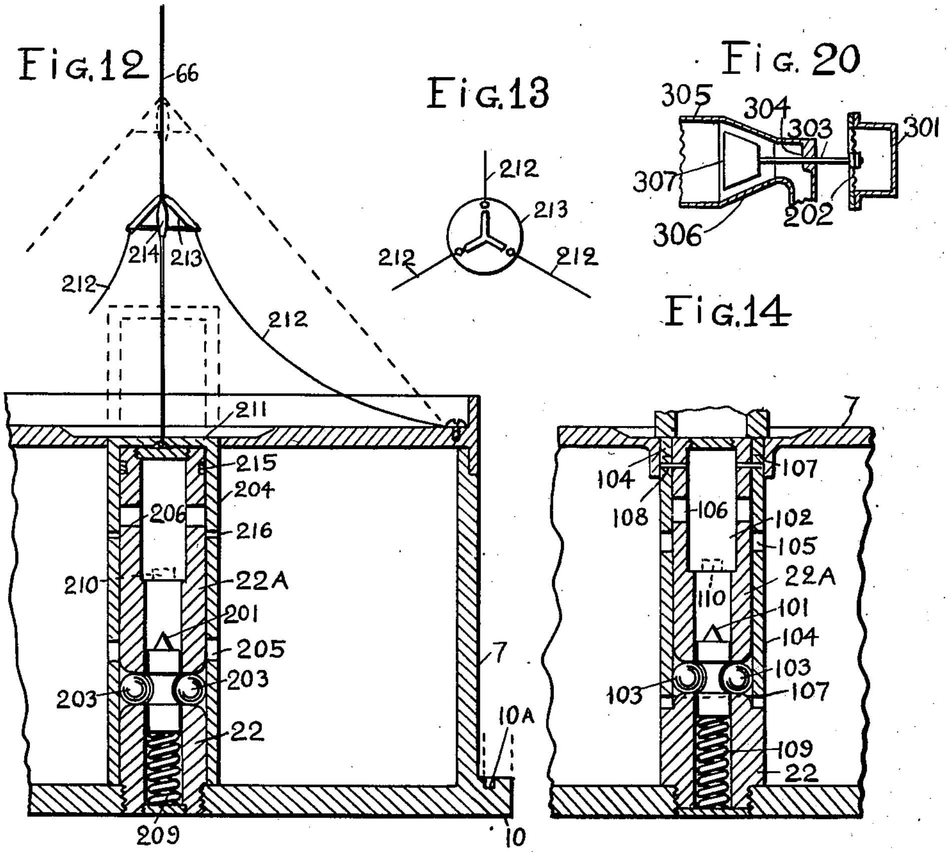
FIG. 12, FIG. 13, FIG. 14, FIG. 20
FIG. 16
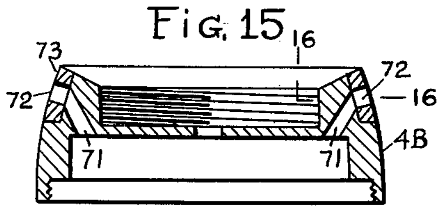
FIG. 15
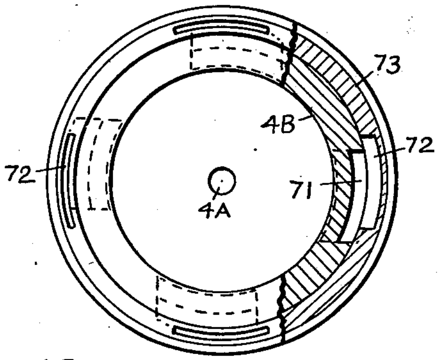
FIG. 17
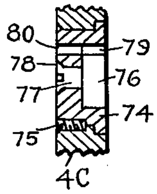
FIG. 18
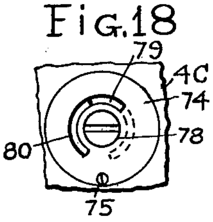
FIG. 19
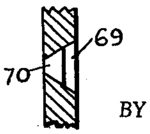
NICHOLAS NELSON
INVENTOR.
BY John P. Nikonow
ATTORNEY Patented Sept. 14, 1943

2,329,414

UNITED STATES PATENT OFFICE 2,329,414

AERIAL APPARATUS

Nicholas Nelson, New York, N. Y., assignor to Joseph Z. Dalinda, New York, N. Y.

Application September 18, 1940, Serial No. 357,226

24 Claims. (Cl. 102—63)

This invention relates to aerial apparatuses and particularly to an aerial apparatus comprising an automotive aircraft of the rotating wing type, a useful load supported by the aircraft, and a protective housing for the aircraft and the load. The useful load in such an apparatus may be a light-generating mechanism, an acoustic device, an antiaircraft impedimental device, or any of a variety of other devices and mechanisms.

In my previous application, U. S. Serial No. 297,977, filed October 5, 1939, I have disclosed an aerial apparatus for similar purposes. The present application discloses an apparatus with structural features which differ from those of the prior apparatus and which enable it, in especial, to hover substantially at a point, whereas the apparatus previously disclosed could maintain itself in flight only in a closed path of material diametric span.

Hitherto loads of the character cited above have generally been supported in the air by parachutes or by balloons, captive or free. These means of suspension are effective or unsatisfactory in several essential respects. Parachutes descend very rapidly, especially in rarified air and when burdened with a load. Captive balloons are limited in the altitude attainable. Free balloons ascend slowly and tend to gain or lose altitude. Neither type of balloon is easily manageable, nor can it be sent up quickly at need. In addition, being readily visible, they are of little value when used as an antiaircraft barrage.

A principal object of this invention is to provide a device capable of being stowed collapsibly within a container such as a shell, capable of being projected into the air within its container by means such as gunfire, and capable thereafter upon release from its container of sustaining itself, including a constituent useful load, substantially at a desired point in the air.

To attain this end, I provide a load-sustaining device comprising an aircraft which is of rotating-wing type and which is collapsible in construction. While types of rotating-wing aircraft such as various forms of the autogyro, and also conventional airplanes, may serve adequately for this purpose, I employ a helicopter because it is best adapted to maintain itself in hovering flight at a given point instead of pursuing flight in a path, and because it is simplest in construction.

To this end, I further provide a mechanism to regulate the rate of fuel flow to the engine in such wise that at any given altitude the engine will be supplied with just enough fuel to develop power sufficient to maintain the device in hovering flight at that altitude.

Another object of this invention is to provide a protective housing for the device to serve both during transportation and storage and during translation of the device from the ground to the point in the air whereat the device is desired to function.

A further object of the invention is to provide a means of translation or projection of the device to a desired point in the air. I place my device in the air conveniently, rapidly, and accurately by projection of the housed device, encased in a shell, by gunfire, the gun used being optionally either rifled or smoothbored. The device may also be taken aloft by a carrier aircraft and released therefrom into the air, or it may be projected into the air from a catapult, or by jet reaction, or by other known means.

The term aerial apparatus as used herein hereafter therefore designates an apparatus comprising (1) a device comprising a rotating-wing aircraft capable of sustaining itself and a useful load at a desired point in the air, (2) a useful load suspended from or contained within the device, (3) a protective housing for the device, and in some embodiments of the invention, for the load, (4) a shell, enclosed wherein the above three structures are projected from the ground into the air, except when the apparatus is taken aloft by an aircraft carrier of suitable character, and (5) suitable operatively connective means.

Other objects of my invention are to provide means for expelling my device with its protective housing from the shell at a desired point on the trajectory of the shell, and to provide means for controlling the manner of expulsion and the magnitude of the expelling force. To this end, I provide an explosive expelling charge and means for dissipating, when desired, a portion of the energy made available by the charge to effect expulsion.

Further objects of the invention are: to provide an apparatus whose structures are adapted to withstand the compressions developed in firing and the forces developed by axial rotation initiated by the firing; to provide a device comprising an aircraft with strong, rigid rotating wings which are adapted to be folded; to provide a device comprising an aircraft with means for setting the engine of the aircraft into operation automatically; and to provide a device characterized by aerodynamic stability in the absence of pilot control. These ends are attained by structural provisions as described hereinbelow and illustrated in the drawings.

Still another object of the invention is to provide a device characterized by ease and low cost of manufacture. The fabrication and assembly of the component parts of my device are simple and well suited to a mass production technique.

The specific nature of this invention and its objects and advantages will appear from the preferred embodiment of the invention. In this embodiment the apparatus comprises a shell adapted to be fired from a rifled gun, a receptacle or container fitting into the shell, a helicopter constructed so as to fit into the receptacle, an explosive bomb fitting into the shell, a length of wire wherewith the bomb is suspended from the helicopter in operation in the air, and an explosive charge within the shell for the expulsion of the contents of the shell at a desired time. This embodiment of the apparatus is intended for use as an antiaircraft barrage device.

The shell may be of any desired type. For ease of use, it may be a conventional shell of such dimensional configuration that it will fit into a gun of standard caliber. The weight and distribution of weight of and in the shell may be varied so that the projectile as a whole will conform to any ballistic requirements.

The receptacle or container is a tubular cylinder spit into two equal longitudinal sections. The ends of the cylinder are partly cut away to form thin lips or tongues which fit into circular grooves cut in a flange extending from the bottom of the bomb and in an overlapping circular cover plate, respectively. The structures fit together snugly but are readily detachable, so that when expelled from the shell, the component parts can readily fall apart. The cover plate and the flange at the bottom of the bomb fit snugly into the shell, but elsewhere a slight clearance is left between the inner surface of the shell wall and the outer surface of the receptacle wall.

In addition to serving as a container for the helicopter, the receptacle functions as an additional shell wall. When the shell is fired, at any section in the shell wall stresses are developed by the inertia of the masses in front of the section and bearing upon it. The receptacle walls, in addition to absorbing the compression resulting from their own inertia, absorb a portion of the compressive stress which the shell wall would otherwise be called upon to withstand alone. A shell wall thinner than in the conventional shall may therefore be used.

The helicopter comprises two double-bladed airscrews, an internal combustion engine, gearing for the transmission of engine power to the airscrews, a fuel tank, engine accessories, and the structures necessary for the proper set-up and operation of these parts. A solid framework comprising various structures extends longitudinally through the helicopter body and transmits compressions in firing of the shell and during discharge of the receptacle from the shell.

The airscrews are mounted on two concentric sleeves respectively and to neutralize torque are rotated in opposite directions by suitably designed transmission gearing. The blades of the airscrews are swiveled on pivots so that for insertion into the receptacle they may be folded parallel to the longitudinal axis of the helicopter.

The internal structures of the helicopter are arranged in sequence in such wise that they form a longitudinal framework whose radius of gyration at any transverse section is kept at minimum or as near to it as is practicably possible. This framework transmits to the base of the shell a portion of the force of explosion during expulsion and the compression developed by the inertia of the helicopter masses during firing of the shell. The transmission of these compressions to the base is through a hollow central shaft in the bomb.

The bomb is a cylindrical body with walls indented to allow the folded airscrew blades to lie flatly against the indented surfaces. The metal mass of the bomb body is in such ratio to the mass of explosive contained in the body as to produce a desired fragmentation effect. The bomb may be provided with a fuze of any desired type; designs for suitable fuzes of impact and supersensitive types are described herein and shown in the drawings.

The bomb is connected to the helicopter by means of a length of wire of great tensile strength. This wire is wound in a loop around the body of the helicopter at its bottom end. When the bomb is free to fall away from the helicopter, the wire unwinds from the loop. If the wire unwinds at too great a rate, the bomb may develop enough momentum to break the wire when its fall is stopped suddenly at the conclusion of the unwinding. To prevent this, the coils of the loop of wire are sealed or soldered into place and have to be ripped out by the weight of the bomb. If preferred, an escapement shell mechanism to control the rate of unwinding may be provided.

To expel from the shell the protective container with its load when the shell reaches a predetermined point in the air, an expelling charge of suitable force is provided in a chamber. The chamber is formed by a cavity in the adapter which joins the fuze with the shell body. The cover plate of the receptacle serves as the floor of this chamber and constitutes a gas-tight sealing lid which confines the hot gases of explosion to the space above the cover plate.

When the shell reaches a desired point on its trajectory, the expelling charge is ignited by a time fuze and expels the bomb and the receptacle with its contents from the body of the shell, simultaneously reducing the absolute velocity of the expelled bodies. A counter-revolution may also be imparted to these bodies by known means, such for instance, as a system of helical grooves and tongues.

Although any residual velocity of the ejected bodies will be quickly dissipated by the resistance of the air to their motion, it is desirable to reduce the absolute velocity of these bodies during ejection as nearly completely as possible. Since the velocity of the shell varies with its position on the trajectory, it is desirable to have the magnitude of the force of expulsion variable at will to correspond to the velocity to be reduced. To this end, openings with inwardly removable plugs, or sliding panels, or shuttered windows of any suitable type may be incorporated into the adapter wall so that openings of suitable size leading from the powder chamber to the outside air may be created at will in the adapter wall by proper adjustment and setting of the shutters or of the position of the slip-ring, or by removing a necessary number of the plugs.

When the distance which the shell is to traverse before expulsion is small, the absolute velocity of the contents of the shell is large, and hence a large force of expulsion is desired. The openings in the adapter wall are then closed or held to a minimum. When the expulsion is to take place after traverse of a long trajectory, the velocity to be countered is lesser and consequently the openings are made large enough so that a desired portion of the force of explosion which is developed will be dissipated by the escape of the gases of explosion through the openings.

In operation, when the shell is fired and reaches a given point on the trajectory, the time fuze explodes the expelling charge. The force developed by this explosion acts upon the cover plate and is transmitted by the walls of the receptacle to the cover and walls of the bomb and thus to the base of the shell. The base is held in place only by relatively weak retaining pins which are shorn by the force of explosion. The receptacle with its enclosed helicopter, the bomb, and the base are thus ejected from the shell.

Following expulsion, the base of the shell drops off, followed by the sections of the receptacle which are loosely held together and fall apart. The centrifugal force produced by the residual rotational velocity of the helicopter extends the folded airscrew blades radially. When in this position, in which they are held by centrifugal force or by a suitable locking mechanism, they are set into rotation in opposite directions by the starting mechanism of the engine and develop a thrust sufficient to dissipate quickly any initial downward momentum of the helicopter and to maintain it in hovering flight.

Being supported only by the unwinding wire, the bomb falls away downward at a rate controlled by the unwinding rate. When the wire coils are fully unwound, the bomb is maintained suspended from the helicopter, the center of gravity of the system as a whole being well below the center of gravity of the helicopter proper.

When an airplane or other aircraft collides with the device, with a supersensitive fuze the bomb is exploded instantaneously by the sudden tug on the wire. When an impact fuze is used, the helicopter-wire-bomb system is "frozen" to the body struck, being drawn through the air until it acquires the velocity of the pulling aircraft. When this velocity is attained, a static situation prevails; the drag of the helicopter being greater than that of the relatively massive bomb, the wire slides past the aircraft, drawing the bomb towards the aircraft. The bomb is exploded by impact against the aircraft.

The helicopter herein described is not concerned with factors of normally great importance, such as safety in the event of engine failure, speed capacity, or rate of vertical climb, since all that is expected of it is the capacity to sustain itself in hovering flight for a period of time. Helicopters, especially of small weight, have proven fully capable of this performance provided the disk loading is maintained below a certain value and provided the weight-power ratio does not exceed a certain value.

To describe the invention more clearly, attention is now directed to the drawings which accompany and form part of this specification, which illustrate the preferred embodiment of the invention specifically intended for use as an anti-aircraft barrage device, and of which Fig. 1 is a longitudinal sectional view of a projectile comprising an embodiment of my invention;

Fig. 12 is a cross-sectional view of the bomb shown in Fig. 1, showing the details of the bomb fuze construction;

Fig. 13 is a detail view of the wire suspension structure shown in Fig. 12;

Fig. 14 is a view of a modified bomb fuze construction;

Fig. 15 is a cross-sectional view showing a modified adapter wall construction with gas vents;

Fig. 16 is a partly sectioned top view of the adapter wall construction shown in Fig. 15;

Fig. 17 is a sectional view of another modified gas vent construction in the adapter wall;

Fig. 18 is an elevational view of the adapter wall gas vents shown in Fig. 17;

Fig. 19 is a cross-sectional view of still another modified construction of the adapter wall with gas vents;

Fig. 20 is a cross-sectional view of an aerostatic valve regulating the flow of fuel to the engine shown in Figs. 1 and 7.

Figure 8:
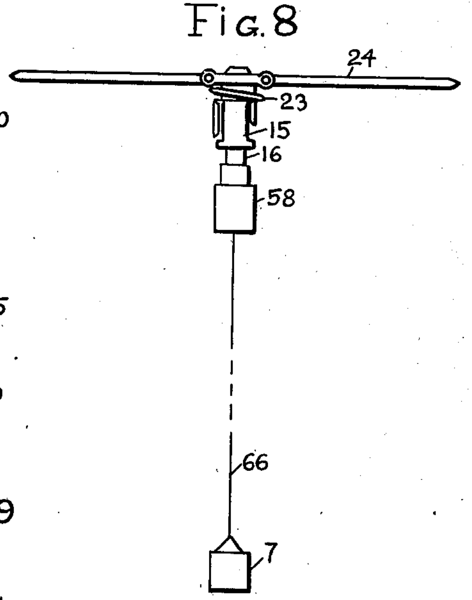
Fig. 8 is an elevational view showing the device of Fig. 1 in operative condition in the air.

In the embodiment shown in Figures 1 to 6 inclusive, and Fig. 8, my aerial apparatus consists of a small helicopter and a bomb enclosed together in a receptacle which in turn is inserted in a shell with a wire connecting the bomb and the helicopter.

The body of the shell is a tubular cylinder 1 closed at its rear end by a base plate 2 retained in place by shearing pins 3. The upper end of the cylinder is fitted with an adapter 4 supporting a time fuze 5 of any desired type.

Within the cylinder is a receptacle consisting of a tubular cylinder split longitudinally into two equal sections 6 and 6A. The receptacle houses a bomb 7 in its bottom portion and a helicopter in its upper portion. The curved rims of the sections 6 and 6A are partly cut away to form lips 8 fitting respectively into a circular groove 9A in the face of a cover plate 9 at the top of the receptacle and into a similar groove 10A in a circular flange 10 extending from the bottom of the bomb 7. The fit of these lips and grooves is snug but not tight so that these structures may readily fall apart.

The cover plate 9 constitutes the floor of a chamber 11 formed by the plate with the cavity in the adapter 4. An expelling charge 12 is placed in this chamber and communicates with the fuze 5 through a passage 4A.

A slight clearance (not shown) is provided between the shell wall and the receptacle wall to prevent frictional "freezing" shoud the receptacle walls tend to bulge outwards under action of centrifugal force. Shallow, narrow grooves 1A and 6B are partly cut into the shell wall and the receptacle wall respectively, and are filled with bearing balls or rollers to reduce friction and thus to facilitate expulsion of the receptacle from the shell. These grooves may be straight, but to reduce to a desired extent the absolute rotational velocity of the receptacle during expulsion, they are given a helical twist in the proper direction.

The structures of the helicopter are mounted on a central framework. At the nose end, a shaft 13 carries at its upped end a cap 14, preferably of a square tapering shape fitting into a corresponding square depression in the plate 9. This fit centers the shaft and simultaneously prevents relative rotation between the container and the helicopter. The lower end of the shaft 13 is rigidly fitted into a bracket 15 and tightly clamped against the upper end of the cylinder 16 of an internal combustion engine. The cylinder head has integrally formed extensions 18 connected to a tubular leg 19 passing inside of the gasoline tank 20 and supporting the carburetor 21. The lower end of the leg 19 rests on the top cover of the bomb 7, its thrust on the bomb top being transmitted to the base plate 2 of the shell through a hollow central shaft 22 in the bomb.

The helicopter is provided with two-double-bladed airscrews 23 and 24 rotating in opposite directions. The blades of the airscrews are relatively long and are pivotally connected to lugs 25 and 26 extending respectively from hubs 27 and 28. The pivot pins 29 and 30 pass through suitable holes in the blade shanks 31 and 32.

The pivots are in the plane of the blades and are inclined to the plane of the hubs at an angle equivalent to the desired aerodynamic angle of attack of the blades. When the blades are rotated on the pivots to lie parallel to the axis of the craft, the plane of each blade is at right angles to radius passing from the longitudinal axis of the craft through the center of the blade. When the blades are extended radially, their chords are in a plane inclined at an angle equivalent to the angle of attack to the plane of rotation. The longitudinal axis of the blades forms the same angle with the axis of the respective hubs.

The shanks 31 and 32 of the blades are provided with lips 33 which bear against corresponding surfaces 34 in the lugs 25 and 26, so that the blades cannot be rotated more than 90° upwards from the folded position. In operation, they are maintained extended both by action of centrifugal force and by reaction of the column of air accelerated downwards by the propeller action.

When desired, the blades may be further shortened or collapsed by being folded on a second pivot or hinge nearer the blade tips, or by being made of extensible telescoping sections.

The bracket 15, into which the shaft 13 is fitted, consists of two halves joined together by bolts or screws 35. The other end of the bracket is clamped around the upper end of the engine cylinder 16, the cylinder being provided with a flange 36 fitting into a corresponding groove in the bracket.

The hub 28 is mounted on a sleeve 38 rotating on ball bearings 39 supported on the central shaft 13. A bevel gear 40 is rigidly mounted on the lower end of the sleeve 38 and is in mesh with a bevel gear 41 keyed on an intermediate shaft 42 journaled in the bracket 15. The hub 27 is mounted on a sleeve 43 supported on ball bearings on the inner sleeve 38 and carries a bevel gear 44 in mesh with the bevel gear 45 mounted on the other end of shaft 42. A spur gear 46 is keyed on the free end of the shaft 42 and engages a corresponding gear 47 on the end of a crank shaft 48 also journaled in the bracket 15.

The crank shaft 48 consists of two halves connected by a pin 49 supporting one end of a connecting rod 50 whose other end is connected to a pin 51 in a piston 52 sliding in the engine cylinder 16. This crank shaft 48 is connected at the other end to a self starter consisting of a spiral spring 53 in a casing 54. The spring is connected at one end to the side of the casing, the other end being attached to a small hub 55 on the end of the shaft. The spring is tightly wound, but cannot turn the shaft until the propeller blades are free to rotate.

Figures 1, 2, 3:
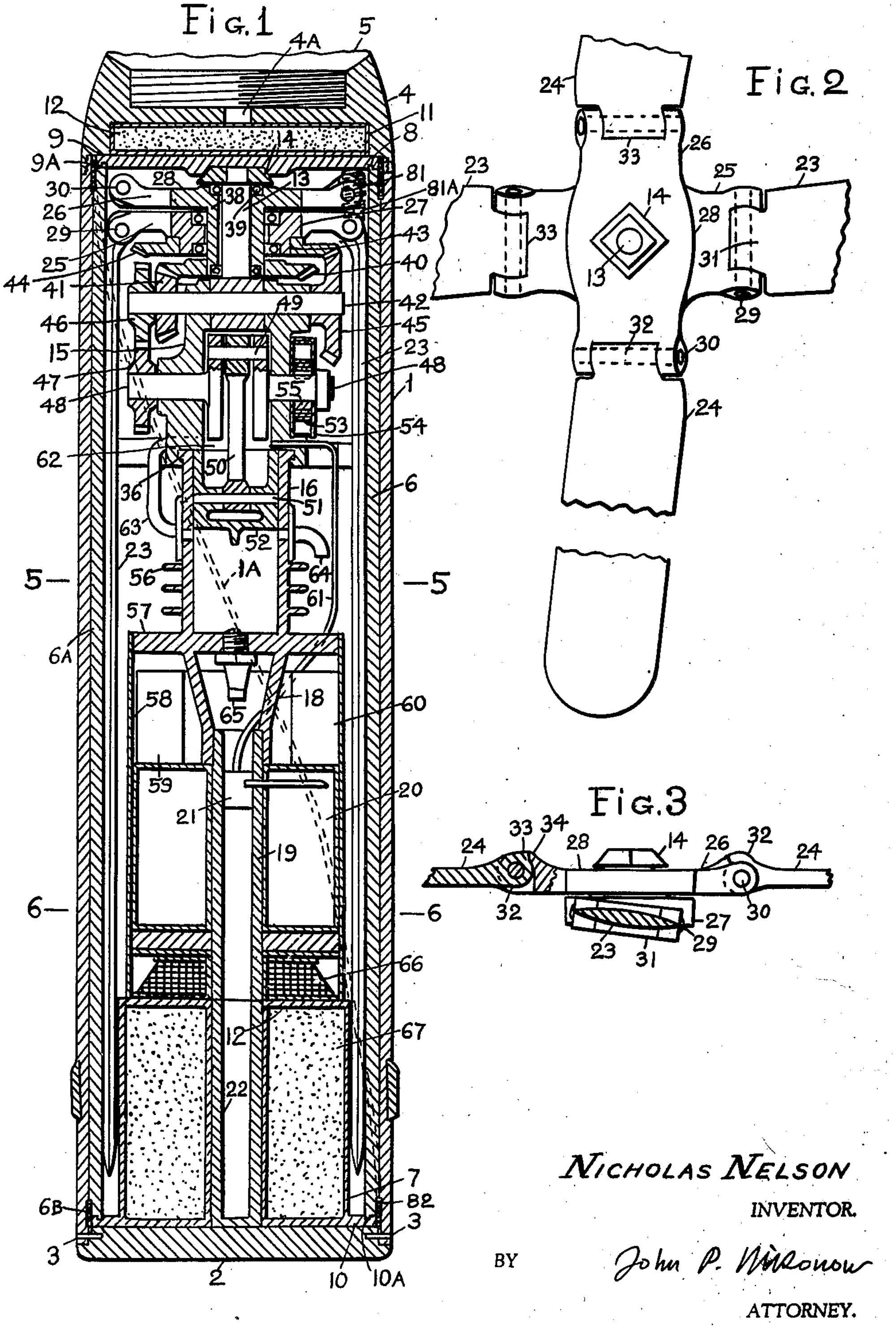
Fig. 2 is a fractional plan view of the construction of the airscrews shown in Fig. 1.
Fig. 3 is a partly sectioned side view of the airscrew construction shown in Fig. 2.
Figure 4:
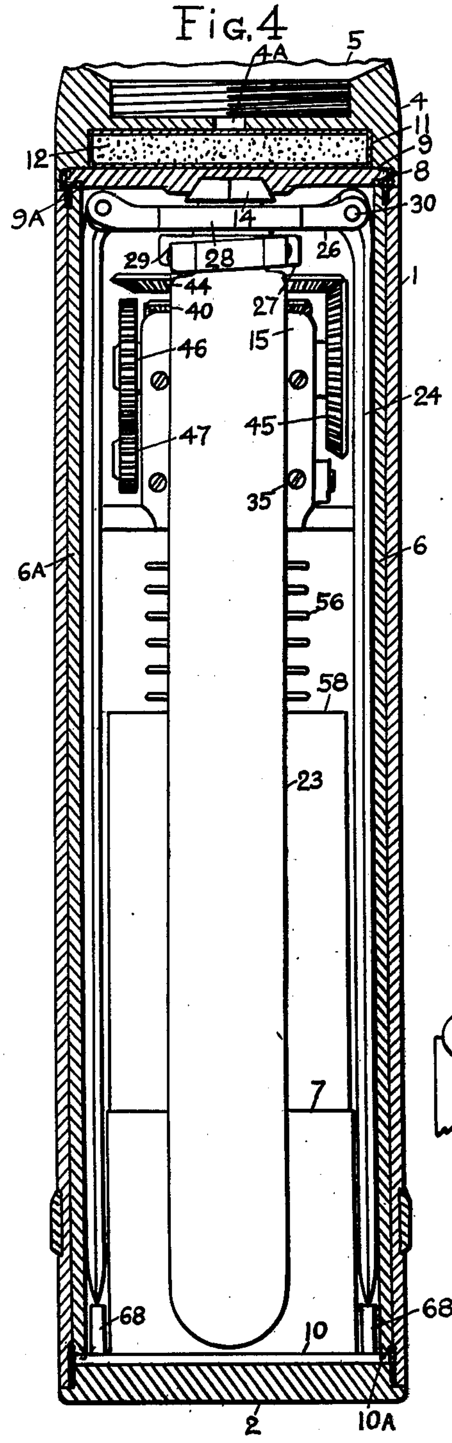
Fig. 4 is a partly sectioned longitudinal view of the projectile shown in Fig. 1.
Figure 5:
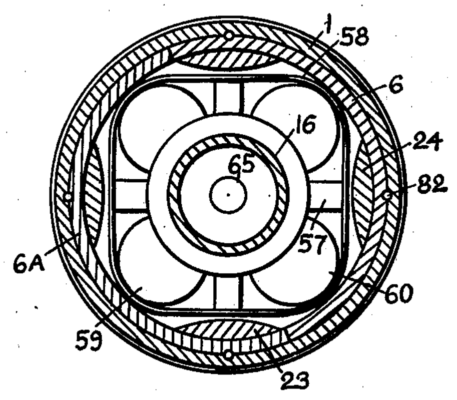
Fig. 5 is a cross-sectional view taken on the line 5—5 of Fig. 1.

The cylinder 16 is provided with cooling fins 56 and has radial arms 57 supporting a tubular body 58. This body, as shown in Figure 5, has four depressions or indentations in its peripheral surface to allow the airscrew blades to lie flatly against it when they are folded. The upper portion of this body contains engine accessories, including an ignition coil 59 and a battery 60. The annular gasoline tank 20 is supported below, with a central carburetor 21 from which a pipe 61 leads to the crank case 62, the engine being of a two-cycle type. The intake pipe 63 is connected to the crank case through a suitable valve (not shown), the exhaust 64 being open at the side of the cylinder. A spark plug 65 is fitted into the cylinder head.

The bottom of the body 58 is cut down in diameter to form a spool for a wire 66 of suitable length. The ends of the wire are attached to the bomb 7 and to the bottom of the body 58 respectively. The coils of wire 66 wound on the body are sealed or soldered together in a known manner in such wise that when the weight of the bomb in operation exerts a tensile force upon the wire, the rate at which the coils unwind will be slow and the bomb will thus not acquire too great a downward momentum.

The bomb 7 consists of a metal case filled with a change 67 of a suitable explosive. The weight of metal is in such ratio to the weight of explosive as to provide a desired fragmentation effect.

The fuze which ignites the explosive charge 67 in the bomb is encased in the core of the hollow fuze shaft 22. Two fuze mechanisms are shown in the drawings, one of the impact type and the second of the supersensitive type. Additional fuzes of a simple impact type (not shown), with retractable firing pins extending laterally from the side walls of the bomb, may be used, if desired, to assure explosion of the bomb in the event it is struck laterally radially so that no vertical momentum components are developed.

The cylindrical walls of the body proper of the bomb are indented to accommodate the lower ends of the blades of the airscrew when lying folded. The blade tips may rest directly on the flange 10, or if desired may be supported by lugs or blocks 68 extending from the flange.

The mounting and arrangement of various parts is so arranged that both in firing and during expulsion from the shell, the compressions developed are transmitted through the strong framework comprising the shaft 13, the bracket 15, the cylinder 16 of the engine, the tubular leg 19, and the fuze shaft 22 of the bomb. The structures mounted on this framework, as for instance the annular fuel tank 20 are so built and disposed on this framework as to have a minimum radius of gyration.

In the impact fuze, shown in Figure 14, a firing pin 101 strikes the primer of a combination detonator-booster 102 located above it in the hollow central core 22A of the shaft 22. While within the projectile, the firing pin is locked in place by two balls 103 held in place by an external sleeve 104 which fits over the core 22A. This sleeve is held in place while within the shell by the projecting end 19A of the tubular leg 19 of the helicopter. Flash holes 105 and 106 are provided in the sleeve 104 and the core 22A respectively, through which the flash of detonation is communicated from the detonator to the charge 67 in the bomb. These flash holes are not in alignment when the sleeve 104 is resting against the supporting surface 107 of the thick bottom portion of the shaft 22. Explosion of the bomb in case of accidental explosion of the detonator is thus prevented. The holes are in alignment when the sleeve 104 moves far enough upward for the locking balls to fall out of place.

Upon expulsion, the bomb falls downward and the momentum of the sleeve is downward against the supporting surface 107. When an aircraft strikes the wire 66, the helicopter-wire-bomb system as a whole is accelerated in the direction of motion of the aircraft. When the system attains the velocity of the aircraft, the situation becomes static, and by virtue of the drag of the helicopter, which is great as compared with the drag of the bomb, the helicopter lags behind and the bomb is drawn by the wire 66 towards the aircraft, the sleeve 104 thus acquiring a momentum towards the aircraft by virtue of its velocity in that direction. Upon impact of the bomb against the aircraft, this momentum shears a frail shearing pin 108 and the sleeve moves upward, bringing the flash holes 105 and 106 into alignment and allowing the two locking balls 103 to fall out of place, releasing the firing pin 101. The firing pin then moves upward instantaneously under action of a compressed spring 109 and strikes the primer 110, exploding the bomb.

In the super-sensitive fuze, shown in Fig. 12, a similar mechanism is provided. The external sleeve 204 has a top cover 211 to which the supporting wire 66 is connected. Three wires 212 are attached symmetrically to the bomb cover and converge to a resilient split-ring "knot" 213. The wire 66 passes through the knot and has a thickened part or stopper 214 between the knot and the sleeve cover 211, the length of the portion of the wire 66 between the stopper 214 and the cover 211 being shorter than any wire 212.

When the bomb falls, the supporting wire 66 moves through the knot 213 until the stopper 214 reaches the ring of the knot, pulling the sleeve 204 upward to a position such that the locking balls 203 are on the point of falling out of place and the three wires 212 are drawn taut. When the wire 66 is struck by an aircraft, the impact pulls the stopper 214 through the knot 213, further drawing out the sleeve. The locking balls thereupon fall out of place and the spring 209 moves the firing pin 201 upward to strike the primer 210 and to explode the bomb. When the bomb itself is hit, even laterally, the momentum given to it will have a downward component so that the sleeve will move relatively upwards, exploding the bomb.

To prevent the bomb in falling from developing sufficient momentum to pull the stopper 214 through the knot prematurely, the unwinding rate of the wire, as before mentioned, is slowed down in sufficient measure by sealing, soldering, an escapement wheel mechanism, or by any other known means, (not shown in the drawings). In addition, a circular cylinder spring 215 seals the space within the sleeve 204 and thus maintains a partial vacuum within the sleeve when it is pulled upward. The vacuum prevents too fast an upward motion of the sleeve before the stopper reaches the knot. When the sleeve moves upward far enough, the holes 216 in the sleeve pass above the bomb cover and admit air into the sleeve, dissipating the vacuum. The sleeve then moves freely, offering no resistance by vacuum to the passage of the stopper 214 through the knot 213.

The bomb is automatically disarmed with either fuze construction when it descends to the ground, since impact on the bottom of the bomb moves the sleeve downward, holding the balls in place and maintaining the firing pin locked.

In operation, when the shell reaches a desired point on its trajectory, the fuze 5 ignites the expelling charge 12 through the passage 4A. The force developed by the explosion shears the retaining pins 3 and expels the base plug, the bomb, and the receptacle, the cover plate 9 functioning as a pressure plate. The portion of the force accelerating the helicopter is transmitted through the helicopter framework; the portion of the force accelerating the receptacle, the bomb, and the base plate is transmitted through the receptacle walls 6 and 6A.

Since upon the completion of expulsion the expelled bodies should have a negligible residual linear velocity, it is desirable to regulate and control the magnitude of the force developed by the explosion. Since it is impracticable to vary the quantity of charge, openings are provided in the adapter wall to permit a portion of the gases of explosion to escape through them.

These openings may be of any desired character. For instance, as shown in Fig. 19, they may be merely conical holes 69 peripherally spaced and closed by conical plugs 70, or they may be slits 71 (Figs. 15 and 16) in the wall 4B of the adapter, variably exposed by corresponding slits 72 in a peripheral sliding ring 73 which is held adjusted in place by friction.

Again, as shown in Figs. 17 and 18, they may be round holes in the wall 4C of the adapter, accommodating rivets 74. The head of the rivet rests against the inner surface of the wall 4C, the outer end of the rivet being fixed in place by press-fitting or welding of the edges. The rivet is prevented from turning in the hole by a set screw 75. A circular cylinder 76 with a circular shank 77 extends through a hole in the rivet and is locked in place by a counter-sunk head 78 on the shank, or by a nut (not shown). A hole 79, having a cross-sectional form of an arc concentric with the cylinder, is provided in the cylinder and when it is properly superimposed on the hole 80 in the rivet 74, it communicates with the powder chamber 11.

In adjusting, in the first construction a desired number of the plugs 70 are pushed inward into the powder chamber. In the second, the sliding ring 73 is moved until the slit 72 in the ring is superimposed upon the slit 71 in the adapter wall 4B to a desired extent. In the third, the cylinder 76 is rotated until the hole therein is superimposed upon the hole 80 in the rivet body to a desired extent.

In operation, when the shell is to explode after traverse of a short portion of the trajectory, the linear velocity of the bodies to be expelled from the shell is relatively large, and a large force is required to give them a desired deceleration. Consequently small openings or none are provided. Conversely, when the shell is to traverse a large trajectory prior to expulsion, only a relatively small force is required and consequently large openings are allowed to dissipate a considerable portion of the force developed by the explosion.

Following expulsion, the base plate 2, the cover plate 9, and the receptacle walls 6 and 6A become detached and fall off. Springs 81, mounted on lugs 81A extending from the walls 6 and 6A, press against the cover plate 9, urging it off when the receptacle is expelled from the shell, thus initiating and facilitating disjunction of the parts of the receptacle. Alternately, or together with this construction if desired, a spring (not shown) may be provided within the tubular leg 19 to urge the bomb away from the helicopter. In any case the bomb starts to fall away, unwinding the coils of the wire 66.

The residual angular rotation of the helicopter extends the propeller blades at right angles to the axis of the helicopter, allowing the self-starter to turn the crank shaft 48, setting the engine into operation. The blades therefore begin rotating in opposite directions, developing an upward thrust which maintains the helicopter in hovering flight, as shown in Figure 8. Any initial downward momentum of the helicopter is rapidly dampened out by action of this thrust.

Since the power required for hovering flight varies as a function of the altitude in such a way that more power is required in the rare air of great altitudes that at low altitudes, the engine is provided with a mechanism which regulates the flow of fuel from the carburetor to the engine in such a way that more fuel is fed to the engine at great altitudes and less at low, at required rates. The engine therefore develops power at any altitude just sufficient to maintain the device in hovering flight at that altitude.

Figure 20 shows a suitable mechanism, comprising a needle valve arrangement actuated by a diaphragm responsive to changes in barometric pressure. A casing 301, suitably mounted, is closed at one end with a flexible diaphragm 302. A rod 303 attached at one end to the diaphragm 302 slides in a bearing 304 in an opening at a bend in the tube 305 comprising a portion of the carburetor pipe 61. The tube may of course be a portion of the intake pipe 63 instead. The tube 305 has a frusto-conical throat portion 306 for a cone 307 mounted on the end of the rod 303.

The casing 301 is filled with air at atmospheric pressure and is hermetically sealed. The diaphragm responds to external air pressure, causing the cone 307 to move in the throat 306 and thus controlling the flow of fuel through the throat. The fuel supply to the engine and therefore the power output of the engine are thus regulated so as to maintain the lifting power of the air screws just adequate for any given altitude of operation.

When the gun used for projection is smooth-bored, no centrifugal force acts on the propeller blades, and a mechanism must be provided to extend them radially from the longitudinal axis of the helicopter so as to prevent mutual blade interference. This mechanism, not shown in the drawings, may be of any simple type, as for instance a spring which is compressed when the blades are folded.

When an oncoming aircraft strikes the wire by means whereof the bomb is suspended from the helicopter, the bomb is either immediately exploded or first drawn up to strike the aircraft, as outlined previously.

Figure 7:
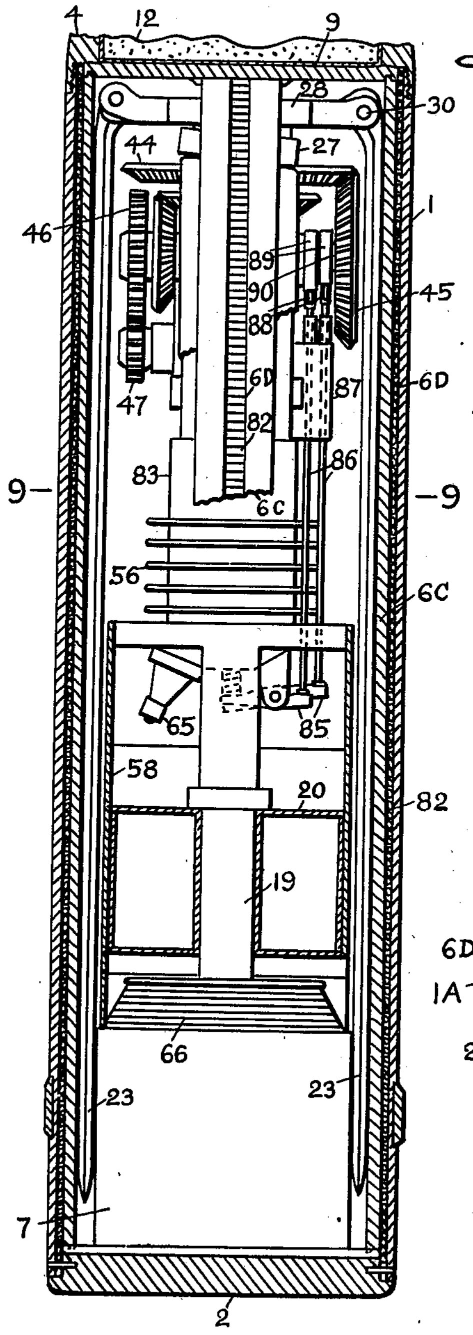
Fig. 7 is a longitudinal sectional view of the projectile of Fig. 1 with a modified engine and other modified constructional details.
Figure 9:
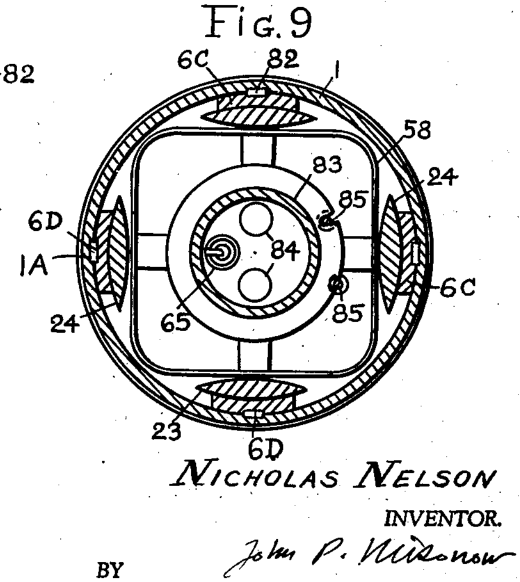
Fig. 9 is a cross-sectional view taken on the line 9—9 of Fig. 7.

A modified apparatus is shown in Figures 7 and 9, the structures modified being the receptacle and the engine. Instead of split sections of a cylinder, the receptacle consists of separate bars 6C. The top ends of these bars rest against the plate 9, with lips in the groove 9A, and the bottom lips enter into the circular groove 10A in the flange 10, the arrangement being in effect a narrowing of the cylinder sections 6 and 6A, four bars being used instead of two cylinder sections.

In this arrangement, the bars 6C, which are placed just over the airscrew blades, are kept from spreading apart during expulsion by centrifugal force until they are fully expelled from the shell, the blades of the propeller being thus protected from being bent by centrifugal force when partly ejected from the shell. The bars 6C are provided with longitudinal grooves 6D in register with corersponding grooves 1A in the cylinder 1. Rollers or bearing balls 82 are placed in these grooves, facilitating the expulsion of the contents of the shell. A heavy graphite grease may be used as a lubricant for these rollers.

Any type of engine or means of propulsion may be used with the helicopter, Figure 7 illustrating the use of a four-cycle internal combustion engine. The cylinder 83 of the engine is provided with overhead valves 84 operated by rocker arms 85 connected with push rods 86 sliding in a bracket 87 and having rollers 88 bearing against cams 89 on a cam shaft 90. The cam shaft is geared to rotate at half the speed of the crank shaft and also serves as a transmission shaft for rotating the airscrews.

Figures 6, 10, 11:
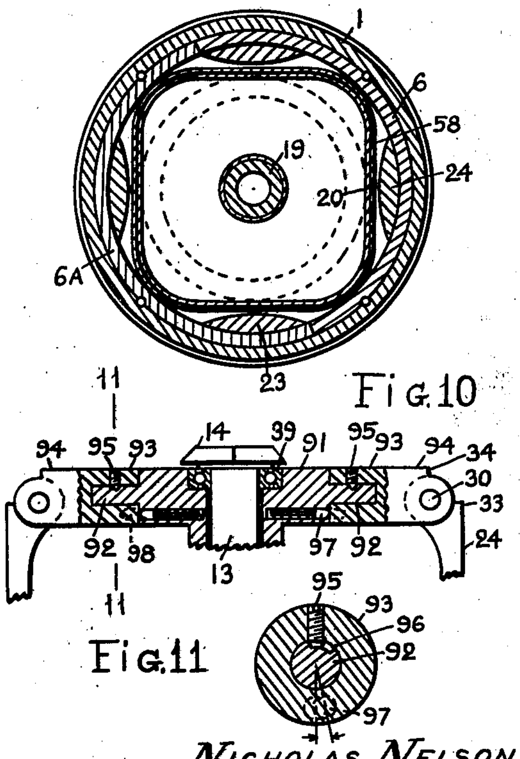
Fig. 6 is a cross-sectional view taken on the line 6—6 of Fig. 1.
Fig. 10 is a partly sectioned view of a modified airscrew hub construction.
Fig. 11 is a sectional view taken on the line 11—11 of Fig. 10.

A modified airscrew construction is shown in Figures 10 and 11. The hub 91 is provided with trunnions 92 rotatively supporting sockets 93 in the blade shanks 94. Set screws 95 are fitted in the sockets, engaging holes 96 in the trunnions. The holes are elongated peripherally, thus allowing a certain freedom of motion for the propeller blades. Specifically, the blades are folded to lie flat against the inner side of the container walls 6 and 6A (or if preferred, against the bars 6C). When opened by centrifugal force, the blades assume a position of least resistance, turning, when extended, into the plane which is inclined at the angle of attack to the plane of rotation. A locking pin 97 then snaps by spring pressure into a corresponding hole 98 in the end of the blade socket, thereby locking the blade in its operative position.

My invention provides an effective and entirely practicable means for attaining at moderate cost the objects hereinbefore enumerated. The component parts of my device are reasonably inexpensive to manufacture and easy to assemble, the operations involved lending themselves readily to a mass production technique and allowing the manufacturer considerable latitude in applying prior knowledge of the art to the design and construction of the device.

The finished shell may be safely and conveniently transported. Its operative effectiveness will not deteriorate with time.

The invention upon which this application is based is broader in scope than the specific embodiment shown and described herein for the purpose of illustrating some of the ways in which the invention may be employed. It is to be understood that appreciable alterations in design and modifications of construction and assembly are possible without departure from the purpose or essential features of the invention. The appended claims are intended to cover any such changes and modifications falling within the intended scope of the invention.

I claim as my invention:

1. An aerial apparatus comprising a casing constituting a container to be projected into the air from guns, tubes, and the like, and consisting of separable elements, a helicoptric aircraft within the container, and a useful load attached to the aircraft, the aircraft comprising a body, helicoptric airscrew blades mounted on one end of the body, an engine within the body, and means to transmit to the airscrew blades the power developed by the engine, means to hold the separable container elements together before projection, means to release the holding means to permit separation of the elements following projection, thereby releasing the aircraft into the air, and means to set the engine into operation following release of the aircraft from the container, the airscrew blades being adapted to support the aircraft, with its load, in hovering flight in the air when rotated by power from the engine.

2. An aerial apparatus comprising a casing constituting a container to be projected into the air from guns, tubes, and the like, and consisting of separable elements, a helicoptric aircraft within the container, and a useful load attached to the aircraft, the aircraft comprising a body, helicoptric airscrew blades mounted on one end of the body, an engine within the body, and means to transmit to the airscrew blades the power developed by the engine, the separable elements being unconnectedly associated so as to fall apart automatically upon projection of the container into the air, thereby releasing the aircraft into the air, and means to set the engine into operation following release of the aircraft from the container, the airscrew blades being adapted to support the aircraft, with its load, in hovering flight in the air when rotated by power from the engine.

3. An aerial apparatus comprising a casing constituting a container to be projected into the air from guns, tubes, and the like, and consisting of separable elements, a helicoptric aircraft within the container, and a useful load attached to the aircraft, the aircraft comprising a body, helicoptric airscrew blades mounted on one end of the body, an engine within the body, and means to transmit to the airscrew blades the power developed by the engine, means to hold the separable container elements together before projection, means to release the holding means to permit separation of the elements following projection, thereby releasing the aircraft into the air, means to set the engine into operation following release of the aircraft from the container, and means to counteract the torque produced on the body by the rotation of the airscrew blades, the airscrew blades being adapted to support the aircraft, with its load, in hovering flight in the air when rotated by power from the engine.

4. An aerial apparatus comprising a casing constituting a container to be projected into the air from guns, tubes, and the like, and consisting of separable elements, a helicoptric aircraft within the container, and a useful load attached to the aircraft, the aircraft comprising a body, helicoptric airscrew blades mounted on one end of the body, an engine within the body, and means to transmit to the airscrew blades the power developed by the engine, means to hold the separable container elements together before projection, means to release the holding means to permit separation of the elements following projection, thereby releasing the aircraft into the air, and means to set the engine into operation following release of the aircraft from the container, the airscrew blades comprising two concentric sets rotatable in opposite directions to eliminate the torque produced on the body, the airscrew blades being adapted to support the aircraft, with its load, in hovering flight in the air when rotated by power from the engine.

5. An aerial apparatus comprising a casing constituting a container to be projected into the air from guns, tubes, and the like, and consisting of separable elements, a helicoptric aircraft within the container, and a useful load attached to the aircraft, the aircraft comprising a body with a longitudinal axis, helicoptric airscrew blades mounted on one end of the body, an engine within the body, and means to transmit to the airscrew blades the power developed by the engine, means to hold the separable container elements together before projection, means to release the holding means to permit separation of the elements following projection, thereby releasing the aircraft into the air means to set the engine into operation following release of the aircraft from the container, the blades comprising hinged sections adapted to be folded substantially parallel to the body axis for insertion with the body into the container, and means to extend the folded sections radially from the body axis upon release from the container, the airscrew blades being adapted to support the aircraft, with its load, in hovering flight in the air when rotated by power from the engine.

6. An aerial apparatus comprising a casing constituting a container adapted to be projected into the air from guns, tubes, and the like and to be rotated about its axis during flight, and consisting of separable elements, a helicoptric aircraft within the container, and a useful load attached to the aircraft, the aircraft comprising a body with a longitudinal axis, helicoptric airscrew blades mounted on one end of the body, an engine within the body, and means to transmit to the airscrew blades the power developed by the engine, means to hold the separable container elements together before projection, means to release the holding means to permit separation of the elements following projection, thereby releasing the aircraft into the air, and means to set the engine into operation following release of the aircraft from the container, the blades comprising hinged sections adapted to be folded substantially parallel to the body axis for insertion with the body into the container and adapted to extend radially from the axis under action of centrifugal force upon release of the aircraft from the container, the airscrew blades being adapted to support the aircraft, with its load, in hovering flight in the air air when rotated by power from the engine.

7. An aerial apparatus comprising a casing constituting a container adapted to be projected into the air from guns, tubes, and the like and to be rotated about its axis during flight, and consisting of separable elements, a helicoptric aircraft within the container, and a useful load attached to the aircraft, the aircraft comprising a body with a longitudinal axis, helicoptric airscrew blades mounted on one end of the body, an engine within the body, and means to transmit to the airscrew blades the power developed by the engine, means to hold the separable container elements together before projection, means to release the holding means to permit separation of the elements following projection, thereby releasing the aircraft into the air, and means to set the engine into operation following release of the aircraft from the container, the blades comprising hinged sections adapted to be folded substantially parallel to the body axis for insertion with the body into the container and adapted to extend radially from the axis under action of centrifugal force upon release of the aircraft from the container, the axes of the blade hinges being inclined to the axis of the body at such an angle that the blades of the airscrew when fully unfolded and extended intersect the plane in which the blades lie at a desired operational angle of incidence, the said plane being substantially at right angles to the said body axis, the airscrew blades being adapted to support the aircraft, with its load, in hovering flight in the air when rotated by power from the engine.

8. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the load, in hovering flight in the air when rotated by power transmitted from the engine.

9. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, the separable elements being unconnectedly associated so as to fall apart automatically when the container is ejected from the shell casing, thereby releasing the aircraft into the air, and means to set the engine into operation upon release of the aircraft from the container into the air, the airscrew blades being adapted to support the aircraft, including the load, in hovering flight in the air when rotated by power transmitted from the engine.

10. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, means to prevent the engine from operating while within the container, and means to release the preventing means and to set the engine into operation upon release of the aircraft from the container into the air, the airscrew blades being adapted to support the aircraft, including the load, in hovering flight in the air when rotated by power transmitted from the engine.

11. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, means to set the engine into operation upon release of the aircraft from the container into the air, the airscrew blades being adapted to support the aircraft, including the load, in hovering flight in the air when rotated by power transmitted from the engine, and means on the body resistant to motion through air to counteract the torque produced on the body by the rotation of the airscrew blades.

12. An antiaircraft projectile comprising an outer shell casing, an inner casing within the shell casing, constituting a container and comprising separable elements, a helicoptric aircraft within the container comprising a body, a useful load attached to the body, an engine within the body, helicoptric airscrew blades mounted on one end of the body in two concentric sets to rotate in opposite directions, thereby eliminating the torque on the body produced by blade rotation, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the load, in hovering flight in the air when rotated by power transmitted from the engine.

13. An antiaircraft projectile comprising an outer shell casing, an inner casing within the shell casing, constituting a container and comprising separable elements, a helicoptric aircraft within the container comprising a body having a longitudinal axis, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a predetermined time following projection of the projectile, means to hold the separable elements together before ejection, means to release the holding means and to permit separation of the elements following ejection, thereby releasing the aircraft into the air, means to set the engine into operation upon release of the aircraft from the container into the air, the airscrew blades comprising hinged sections adapted to be folded substantially parallel to the said body axis for insertion with the body into the container, and means to unfold the hinged sections and extend them radially from the body axis following release of the aircraft from the container, the airscrew blades being adapted to support the aircraft, including the load, in hovering flight in the air when rotated by power transmitted from the engine.

14. An antiaircraft projectile comprising an outer shell casing, an inner casing within the shell casing, constituting a container and comprising separable elements, a helicoptric aircraft within the container comprising a body having a longitudinal axis, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, means to set the engine into operation upon release of the aircraft from the container into the air, the airscrew blades comprising hinged sections adapted to be folded substantially parallel to the said body axis for insertion with the body into the container, and adapted to extend radially from the axis under action of centrifugal force upon release of the aircraft from the container, the airscrew blades being adapted to support the aircraft, including the load, in hovering flight in the air when rotated by power transmitted from the engine.

15. An antiaircraft projectile comprising an outer shell casing, an inner casing within the shell casing, constituting a container and comprising separable elements, a helicoptric aircraft within the container comprising a body having a longitudinal axis, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, means to set the engine into operation upon release of the aircraft from the container into the air, the airscrew blades comprising hinged sections adapted to be folded substantially parallel to the said body axis for insertion with the body into the container and adapted to extend radially from the axis under action of centrifugal force upon release of the aircraft from the container, the axes of the blade hinges being inclined to the axis of the body at such an angle that the blades of the airscrew when fully unfolded and extended intersect the plane in which the blades lie at a desired operational angle of incidence, the said plane being substantially at right angles to the said body axis, the airscrew blades being adapted to support the aircraft, including the load, in hovering flight in the air when rotated by power transmitted from the engine.

16. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, means to set the engine into operation upon release of the aircraft from the container into the air, and means to regulate the power output of the engine by regulating the rate of flow of fuel to the engine, the airscrew blades being adapted to support the aircraft, including the load, in hovering flight in the air when rotated by power transmitted from the engine.

17. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, means to set the engine into operation upon release of the aircraft from the container into the air, and means to regulate the power output of the engine by regulating the rate of flow of fuel to the engine, the regulating means being responsive to and controlled by aerostatic pressure, the airscrew blades being adapted to support the aircraft, including the load, in hovering flight in the air when rotated by power transmitted from the engine.

18. An antiaircraft projectile comprising an outer shell casing, an inner casing within the shell casing, constituting a container and comprising separable elements, a helicoptric aircraft within the container comprising a body, a bomb attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the bomb, in hovering flight in the air when rotated by power transmitted from the engine.

19. An antiaircraft projectile comprising an outer shell casing, an inner casing within the shell casing, constituting a container and comprising separable elements, a helicoptric aircraft within the container comprising a body, a bomb, a flexible elongated member attached to the bomb at one end and to the body at the other end and adapted to support the bomb suspended from the aircraft, a plurality of helicoptric airscrew blades rotatably mounted on one end of the body, an engine within the body, and means to transmit the power developed by the engine to the airscrew blades for rotation thereof, means to eject the container with its contents from the outer casing into the air at a predetermined time following projection of the projectile, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the bomb, in hovering flight in the air when rotated by power transmitted from the engine.

20. An antiaircraft projectile comprising an outer shell casing; an inner casing within the shell casing, constituting a container and comprising separable elements, a helicoptric aircraft within the container comprising a body, a useful load attached to the body, a shaft extending at one end of the body, helicoptric airscrew blades rotatably mounted on the shaft, an engine within the body, and means to transmit the power developed by the engine to the airscrew blades for rotation thereof, means to eject the container with its contents from the outer casing into the air at a pre-determined time following projection of the projectile, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the load, in hovering flight in the air when rotated by power transmitted from the engine, the shaft with the engine, the body, and the load while in the container forming a rigid elongated framework adapted to resist the longitudinal compressional stresses developed when the projectile is projected into the air.

21. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, a powder charge at one end of the shell casing, means to ignite the charge for ejection of the container from the shell casing at the expiration of a pre-determined time interval following projection of the projectile, and means to regulate the force of expulsion produced by the powder charge, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the load, in hovering flight in the air when rotated by power transmitted from the engine.

22. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, a powder charge at one end of the shell casing, means to ignite the charge for ejection of the container from the shell casing at the expiration of a pre-determined time interval following projection of the projectile, outside vents in the shell casing for the powder charge, and means to regulate the force of expulsion produced by the charge by regulation of the size of the vents, means to hold the separable elements together before ejection, means to release the holding means and to permit separation of the elements following ejection, thereby releasing the aircraft into the air, and means to set the engine into operation upon release of the aircraft from the container into the air, the airscrew blades being adapted to support the aircraft, including the load, in hovering flight in the air when rotated by power transmitted from the engine.

23. An antiaircraft projectile comprising an outer shell casing, an inner casing within the shell casing, constituting a container and comprising separable elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, mutually corresponding grooves in the inner surfaces of the shell casing and the outer surface of the container elements, anti-frictional elements placed in the grooves to reduce frictional resistance between the container and the shell casing during ejection of the container, means to hold the separable elements together befoer ejection, means to release the holding means and to permit separation of the elements following ejection, thereby releasing the aircraft into the air, and means to set the engine into operation upon release of the aircraft from the container into the air, the airscrew blades being adapted to support the aircraft, including the load, in hovering flight in the air when rotated by power transmitted from the engine.

24. An antiaircraft projectile comprising an outer shell casing, an inner casing within the shell casing, constituting a container and comprising separabel elements, a helicoptric aircraft within the container comprising a body, a useful load attached to the body, a plurality of helicoptric airscrew blades rotatably mounted on one end of the body, an engine within the body, and means to transmit the power developed by the engine to the airscrew blades for rotation thereof, means to eject the container with its contents from the outer casing into the air at a pre-determined time following projection of the projectile, mutually corresponding grooves in the inner surface of the shell casing and the outer surface of the container elements, anti-frictional elements placed in the grooves to reduce frictional resistance between the container and the shell casing during ejection of the container and to prevent relative rotation between the shell casing and the container during projection, the grooves being of spiral configuration for imparting rotation to the container during ejection in the direction opposed to the direction of rotation imparted initially to the projectile in projection, means to hold the separable elements together before ejection, means to release the holding means and to permit separation of the elements following ejection, thereby releasing the aircraft into the air, and means to set the engine into operation upon release of the aircrafts from the container into the air, the airscrew blades being adapted to support the aircraft, including the load, in hovering flight in the air when rotated by power transmitted from the engine.

NICHOLAS NELSON.